J. W. MARSH.

Sewing Machine.

No. 809. Reissued Sept. 6, 1859.

N. PETERS, Photo-Lithographer, Washington, D. C.

UNITED STATES PATENT OFFICE.

JOHN W. MARSH, OF OXFORD, MASSACHUSETTS.

IMPROVEMENT IN SEWING-MACHINES.

Specification forming part of Letters Patent No. 18,511, dated October 27, 1857; Reissue No. 809, dated September 6, 1859.

*To all whom it may concern:*

Be it known that I, JOHN W. MARSH, of Oxford, in the county of Worcester and State of Massachusetts, have invented certain new and useful Improvements in Sewing-Machines, to enable them to trim the seams or cut the work or material at the same time that the sewing is performed, or to sew lap-seams or others with double rows of stitches with facility; and I hereby declare the following to be a full, clear, and exact description of the construction and operation of the same, due reference being had to the accompanying drawings by the letters marked thereon, in which drawings—

Figure 1:
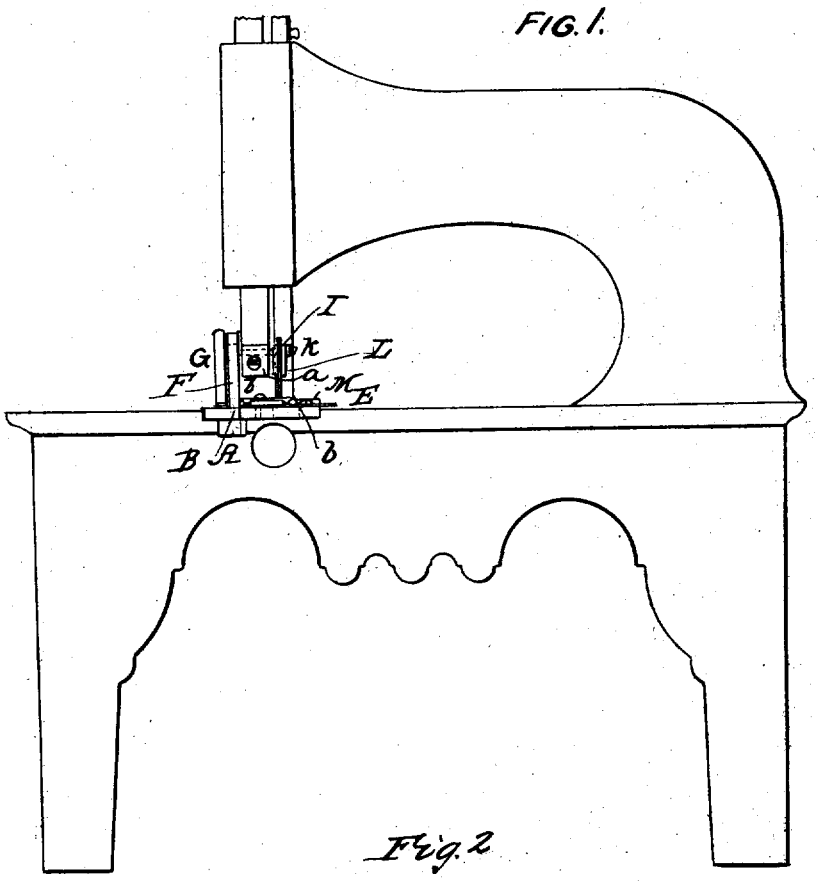

Figure 1 shows a side view of a machine with my improvements; and Figs. 2, 3, 4, and 5 show parts of the same hereinafter to be described.

Figure 2:
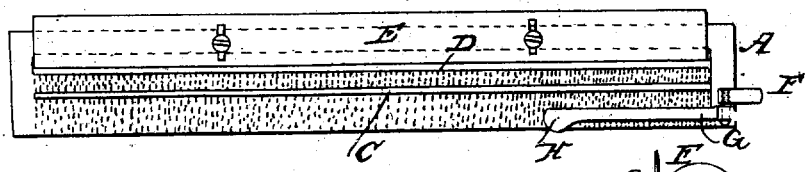
Figure 3:
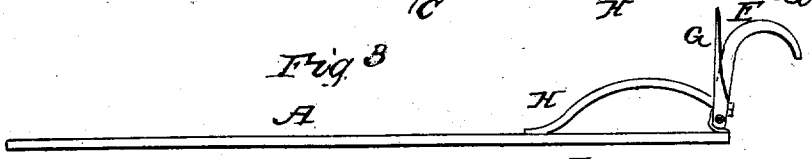
Figure 4:
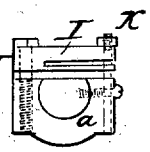

To construct my improvements, make a slide, A, and fit it to slide in a groove in the frame B, the slide having a rack on its under side to fit the gear, if the machine has a gear-wheel feed motion, (the rack not being necessary if what is known as the "awl-feed" or "needle-feed" is used,) and having a slot, C, as shown in Fig. 2, for the needle to pass through, and near that another, D, through which the knife L passes when used. A guard, E, is fitted to the slide by screws through slots, to allow its being set such distance from the needle as it is wanted to sew from the edge of the work, and a stem, F, is put into the slide to draw it back to begin anew. By the side of this is placed a spring-lever, G, which holds a pad, H, pressed onto the work on the slide. To the needle or awl holder is attached the head shown in Fig. 4. *a* is fast to the holder, and I is a knife-carrier, the screw J making it adjustable either toward or from the needle or awl, and K, with its nut, secures the knife L and serves as a guide to I by passing through *a*. The knife I is a thin blade, and placed with its cutting-edge sloping to meet the work, the point being placed back when it is desired to have it cut going down, and the reverse to cut when rising, as in the awl or needle feed machines.

Figure 5:
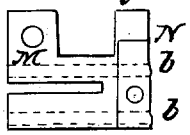

Fig. 5 shows a view of the foot-piece M, with its guide N and spaces necessary for the needle and knife to work through, and has on its under side two grooves to allow the stitches of the first row to pass on either side of the needle without being flattened when sewing the second, the slide having two points, *b b*, to guide the work by to make the seams parallel.

The other parts of the machine may be of most any of the various forms in common use on boot or shoe work, and on that account a more particular description is not deemed necessary.

The operation is: For sewing and trimming a welt seam, the slide A is drawn back and the work placed thereon, the guard E being set if used, the end of the work being held under the foot-piece M, and the other end under the pad H, the knife L being set the distance from the needle that it is wanted to trim the work. It moves with the needle or awl, cutting or trimming the work as fast as the slide is fed along. To sew a lap seam, the knife is removed and the first or lower piece is laid on the slide with its edge against the guard E, which forms a guide for it, and the other piece is laid on and one or both held by the pad H and foot-piece M, as before. In this kind of a seam the guard E is of great utility, as without it it is almost impossible for the workman to keep the under piece in place to make true work, the pad H also assisting in the same. In sewing a second row of stitches the slide N is set to bring one of its points *b* the proper distance, and the first seam is guided to it by the workman. The slide A and its guide E are more particularly adapted to straight work, but can be used with curved by the workman guiding the work, while the knife trims or cuts on straight or curved lines.

It is evident that the knife may be placed in various positions and connected to various parts, or receive its motion from various parts of the machine, or a rotary knife used, and the work fed against them, &c., which would be only variations of forms and not of the principles of my invention—that of trimming or cutting the work near the needle while it is sewing, whereby I am enabled to do it parallel, or very nearly so, with the seam.

I am aware that a stationary knife has been used to cut the thread in some machines; therefore I do not claim a knife for that purpose or operating in that way, or any stationary knife; neither do I claim the use of a slide for a feed motion irrespective of its form and accompaniment; but What I do claim as new, and desire to secure by Letters Patent, is—

1. The combination of the slide A, provided with its guard E and its slot or slots C D, with the foot-piece M, with its guide N and slots, arranged and operating substantially as described.

2. The combination, with the sewing apparatus or its equivalent, of a movable knife operated by a connection with the sewing-machine, so as to trim or cut the work while being sewed, substantially in the manner and for the purposes as above set forth and described.

J. W. MARSH.

Witnesses:
SAML. A. ARNOLD,
JAS. G. ARNOLD.